United States Patent [19]

Kawabuchi et al.

[11] Patent Number: 5,075,377
[45] Date of Patent: Dec. 24, 1991

[54] BLOCK COPOLYMER COMPOSITION

[75] Inventors: Ichiro Kawabuchi; Itsuo Ishii, both of Kurashiki; Akinobu Satoh, Kawasaki, all of Japan

[73] Assignee: Nippon Zeon Co., Ltd., Tokyo, Japan

[21] Appl. No.: 541,947

[22] Filed: Jun. 22, 1990

[30] Foreign Application Priority Data

Jun. 23, 1989 [JP] Japan .................. 1-162028

[51] Int. Cl.$^5$ .................. C08L 53/00; C08L 9/00; C08L 47/00; C08L 53/00
[52] U.S. Cl. .................. 525/89; 525/88; 525/95; 525/98
[58] Field of Search .................. 525/88, 89, 95, 98

[56] References Cited

U.S. PATENT DOCUMENTS

| | | | |
|---|---|---|---|
| 4,259,220 | 3/1981 | Bunnelle et al. | 525/98 |
| 4,699,938 | 10/1987 | Minamizaki et al. | 525/98 |
| 4,739,015 | 4/1988 | Toyota et al. | 525/270 |
| 4,857,594 | 8/1989 | Lakshmanan et al. | 525/98 |

Primary Examiner—Melvyn I. Marquis
Assistant Examiner—W. R. H. Clark
Attorney, Agent, or Firm—Sherman and Shalloway

[57] ABSTRACT

A block copolymer composition comprising
(A) a tri-branched block copolymer (I) having a molecular weight of 150,000 to 450,000 represented by the general formula $$(A-B)_3X$$

wherein A represents a polymer block of an aromatic vinyl monomer, B represents a polymer block of a conjugated diene monomer, and X represents a residue of a tri-functional or tetra-functional alkoxysilane coupling agent, and the weight ratio of the polymer block A to the polymer block B is from 10/90 to 30/70, (B) a di-branched block copolymer (II) having a molecular weight of 100,000 to 300,000 represented by the general formula $$(C-D)_2Y$$

wherein C represents a polymer block of an aromatic vinyl monomer, D represents a polymer block of a conjugated diene monomer, and Y represents a residue of a di-functional to tetra-functional coupling agents, and the weight ratio of the polymer block C to the polymer block D is from 10/90 to 30/70, and (C) a linear diblock copolymer (III) having a molecular weight of 50,000 to 150,000 represented by the general formula $$E-I$$

wherein E represents a polymer block of an aromatic vinyl monomer, and I represents an isoprene polymer block, and the weight ratio of the polymer block E to the polymer block I being from (10/90) to (30/70), the weight ratio of the copolymers (I), (II) and (III) satisfy the following relation (I)/(II) = (20/80) to (90/10) and

[(I) + (II)]/(III) = (45/55) to (80/20).

12 Claims, No Drawings

BLOCK COPOLYMER COMPOSITION

This invention relates to a block copolymer composition suitable for use as a tackifier, and to a tackifier composition containing the block copolymer composition. More specifically, this invention relates to a block copolymer composition having an excellent initial adhesion strength, holding power and coloration stability with time, and to a tackifier composition Heretofore, a polystyrene/polyisoprene block copolymer and other various block copolymers have been used as a base polymer for tackifier compositions. However, a linear blcoked copolymer alone has an excellent initial adhesion strength but its holding power is inferior. A radial block copolymer alone has an excellent holding power but an insufficient initial adhesion strength. Accordingly, it has often been the practice to combine the radial block copolymer with the linear block copolymer (for example, Japanese Laid-Open Patent Publication Nos. 26938/1976 and 26647/1986).

The tackifiers require various properties such as corrugated boards sealability, softeness, processability and thermal stability in addition to the initial adhesion strength and holding powder. In recent years, with the widespread acceptasnce of packaging transparent tapes, there has been an increased requirement for tackifiers having excellent coloration stability with time. However, tackifiers comprising known block copolymers as a base polymer cannot fully meet this requirement.

Accordingly, it is an object of this invention to provide a tackifier which can meet this requirement, and to provide a block copolymer composition which is useful as a base polymer of such a tackifier.

According to this invention, there is provided a block copolymer compoosition (A) a tri-branched block copolymer (I) having a molecular weight of 150,000 to 450,000 represented by the general formula $$(A-B)_3X$$

wherein A represents a polymer block of an aromatic vinyl monomer, B represents a polymer block of a conjugated diene monomer, and X represents a residue of a tri-functional or tetra-functional alkoxysilane coupling agent, and the weight ratio of the polymer block A to the polymer block B is from 10/90 to 30/70, (B) a di-branched block copolymer (II) having a molecular weight of 100,000 to 300,000 represented by the general formula $$(C-D)_2Y$$

wherein C represents a polymer block of an aromatic vinyl monomer, D represents a polymer block of a conjugated diene monomer, and Y represents a residue of a di-functional to tetra-functional coupling agents, and the weight ratio of the polymer block C to the polymer block D being (10/90) to (30/70), (C) a linear diblock copolymer (III) having a molecular weight of 50,000 to 150,000 represented by the general formula $$E-I$$

wherein E represents a polymer block of an aromatic vinyl monomer, I represents a isoprene polymer block, and the weight ratio of the polymer block E to the polymer block I being from (10/90) to (30/70), the weight ratio of (I), (II) and (III) being in such a relation that (I)/(II) is from (20/80) to (90/10) and [(I)+(II)]/(III) is from (45/55) to (80/20).

According to the invention, there is also provided a tackifier composition comprising 100 parts of a block copolymer composition and 10 to 100 parts by weight of a tackifier resin.

The tri-branched block copolymer (I) represented by general formula $(A-B)_3X$ is a tri-branched block copolymer obtained by coupling an A—B type block copolymer with an alkoxysilane-type trifunctional or tetrafunctional coupling agent composed of a polymer block A of an aromatic vinyl monomer and a polymer block B of a conjugated diene monomer having a polymerization active end.

The aromatic vinyl monomer for synthesis of this tri-branched block copolymer is not particularly limited. Specific examples include styrene, alphamethylstyrene and vinyltoluene, and vinylnaphthalene. Of these, the conjugated diene monomers for synthesis of the tri-branched block copolymer are not particularly limited. Specific examples include 1,3-butadiene, isoprene, 2,3-dimethyl-1,3-butadiene, piperylene, and 2,4-hexadiene. Of these, 1,3-butadiene and isoprene are preferred.

The proportion of the polymer block A in the aromatic vinyl monomer in the tri-branched block copolymer is 10 to 30% by weight, preferably 12 to 25% by weight. If this proportion is less than 10% by weight, the resulting tackifier composition has a lowered holding power. If this proportion exceeds 30% by weight, the initial stage adhesion strength of the tackifier composition has a decreased initial adhesion strength.

The weight average molecular weight of the tri-branched block copolymer calculated as polystyrene is 150,000 to 450,000. If the molecular weight is less than the lower limit, the holding power of the tackifying composition becomes insufficient, and if it exceeds the upper limit, the processability of the tackifier composition becomes unsatisfactory.

The coupling agent to be used for the synthesis of the tri-branched block copolymer is a trifunctional or tetrafunctional coupling agent of the alkoxysilane series. If the other coupling agents are used, the object of the invention to obtain a tackifier composition having an initial adhesion strength, holding power, corrugated board sealability, coloration stability with time and processability in a well balanced combination cannot be achieved. The alkoxysilane-type trifunctional or tetrafunctional coupling agent contains 3 or 4 alkoxy groups directly bonded to the silicon atom. At this time, the coupling component may contain at least 2 silicon atoms in the coupling agent compound those bonds which the silicon atom has and is bonded to other than bonds than those which are bonded to the silicon atoms may be bonded to groups which are inert to the ends of the polymerization activity. The type of groups which are inert is not questioned. Specific examples of the coupling agents include phenyltrimethoxysilane, phenyltriethoxysilane, tetramethoxysilane and tetraethoxysilane.

The di-branched block copolymer (II) represented by general formula $(C-D)_2Y$ is a di-branched block copolymer obtained by coupling a C—D type block copolymer with an alkoxysilane-type di-functional to tetra-functional coupling agent composed of a polymer blcok C of an aromatic vinyl monomer and a polymer block D of a conjugated diene monomer having a polymerization active end. Examples of the aromatic vinyl monomers and the conjugated diene monomers used to synthesize the di-branched block copolymer are the same monomers as used for synthesizing the first component.

The proportion of the polymer block C of the aromatic vinyl monomer used in the di-branched is 10 to 30% by weight, preferably 12 to 25% by weight. If this proportion is less than 10% by weight, the holding power of the adhesive composition is decreased. If this proportion exceeds 30%, the initial adhesion strength of the tackifier composition decreases.

The weight average molecular weight of the di-branched block copolymer calculated for polystyrene is 100,000 to 300,000. If the molecular weight is less than the lower limit, the holding power of the tackifier composition becomes insufficient. Further, if it is above the above molecular weight, the processability of the resulting tackifier composition in unsatisfactory.

The coupling agent to be used for synthesis of the di-branched block copolymer is a coupling agent of the alkoxysilane type having 2 to 4 functionality. If other coupling agents are used, it is impossible to achieve the object of the invention to obtain a tackifier composition having a well balanced combination of initial adhesion strength, holding power, corrugated board sealability, coloration stability with time and processability.

The alkoxysilane-type di-functional coupling agents contain two alkoxy groups directly bonded to the silicon atoms. At this time, tow or more silicon atoms may be contained in the coupling agent which are other than those bonded to the alkoxy groups may be bound to groups inert to the polymerization active ends. The type of the inert active groups is not questioned. Specific examples of the di-functional coupling agents are diphenyldimethoxysilane and diphenyldiethoxysilane. The tri-functional or tetra-functional alkoxysilane-type may be the same as the coupling agents used in the synthesis of the first component.

The linear diblock copolymer (III) represented by the general formula E-1 is a third component of the block copolymer composition of this invention and is obtained by block copolymerizing an aromatic vinyl monomer with isoprene.

In the present invention, it is important to use isoprene in the synthesis of the linear diblock copolymer, and if other 1,3-conjugated diene monomers such as 1,3-butadiene and piperylene are used, the effect of this invention cannot be obtained.

The aromatic vinyl monomers used in the synthesis of the first component can be the same as the the monomers used in the synthesis of the first component.

The proportion of the polymer block E in the aromatic vinyl monomer in the linear diblock copolymer is 10 to 30% by weight, preferably 12 to 25% by weight. If this proportion is less than 10% by weight, the holding power of the tackifier composition is decreased. If this proportion exceeds 30% by weight, the resulting tackifier composition has a decreased initial adhesion strength.

The weight average molecular weight of this linear diblock copolymer calculated for polystyrene is 50,000 to 150,000. If this molecular weight is less than the specified lower limit, the holding power of the tackifier composition is insufficient. If it is above the specified upper limit, the processability of the tackifier composition becomes unsatisfactory.

In the block copolymer composition of this invention, it is necessary that the following relation should be established among the weights of the three components (I), (II) and (III), namely (I)/(II)=(20/80) to (90/10), and [(I)+(II)]/(III)=(45/55) to (80/20). If the quantitative ratio is outside these ranges, the balance between the holding power and corrugated board sealability of the tackifier composition becomes unsatisfactory. Preferably, the above relation among the three components is (I)/(II)=(40/60) to (80/20) and [(I)+(II)]/(III)=(50/50) to (75/25).

Within a range which does not impair the effect of this invention, not more than 5% by weight may be replaced by another polymer such as block copolymers other than the third component, natural rubbers, butadiene rubber, or isoprene rubber.

The block copolymer composition of this invention may be obtained by separately synthesizing the first, second and third components and mixing them in the proportions mentioned above by any desired method. It may be prepared by preparing a block copolymer mixture comprising any desired two components among the first to third desired components by controlling the type and amount of the coupling agents in coupling the block copolymers of the (A—B) type in which the polymer block of a conjugated diene-type monomer having a polymerization active end is directly bonded to the polymer block of the aromatic vinyl monomer, and if desired conjointly using a known coupling promoter, and then properly mixing the block copolymer mixture. According to the latter method, the block copolymer composition of this invention may be obtained at a time.

A method of mixing for obtaining the block copolymer composition of this invention may be, for example, a method of heat mixing the components by a Bravender or a kneader.

There is no limitation on the method of synthesizing the branched block copolymer (first component) used in the present invention. For example, the following processes [a] to [d] may be used.

[a] First, in a solvent containing a polar compound, an aromatic vinyl monomer is polymerized with a monolithium initiator. Known monolithium initiators that can be used may be known initiators that can initiate the polymerization of an aromatic vinyl monomer and a conjugated diene monomer. Typical examples include methyllithium, n-propyllithium, n-butyllithium and sec-butyllithium. n-Butyllithium is especially preferred. The amount of the monolithium initiator used may be obtained by a method known to those skilled in the art by calculation according to the molecular weight of the desired monomer.

There is no particular limitation on the polymerization solvent if it is inert to the monolithium initiator. For example, cyclized hydrocarbon solvents, cyclic hydrocarbon solvents, or mixtures of these may be used. Examples of the linear hydrocarbon solvents include linear alkanes or alkenes having 4 to 5 carbon atoms, such as n-butane, isobutane, or a mixture thereof; 1-butene, isobutylene, trans-2-butene, cis-2-butene or mixtures of these; 1-pentene, trans-2-pentene, cis-2-pentene or mixtures of these; n-pentane, isopentane, neo-pentane or mixtures of these; or 1-pentene, trans-2-pentene or mixtures of these. Specific examples of the cyclic hydrocarbon solvents include aromatic compounds such as benzene, toluene and xylene, and alicyclic hydrocarbons such as cyclohexane. From the standpoint of controlling the polymerization temperature and the molecular weight distribution of the polymer blocks of aromatic vinyl monomers, it is preferred to use a mixed solvents of linear hydrocarbon solvents having 4 to 5 carbon atoms, and cyclic hydrocarbon solvent having 4 to 5 carbon atoms in a weight ratio of 5:95 to 50:50, especially 10:90 to 40:60.

The use of the polar compound is not essential. The use of this compound can effect controlling of the polymerization initiation rate, adjustment of the vinyl content of the polymer block of the conjugated diene monomer polymers, the adjustment of the molecular weight distribution of the polymer block of the aromatic vinyl monomer, etc. As the polar compound, aromatic or aliphatic ethers or tertiary amines having a dielectric constant of 2.5 to 5 which are among those known polar compounds used as a vinyl content adjusting agent or a randamizer in the polymerization of conjugated diene type monomers or the copolymerization thereof with an aromatic vinyl monomer by monolithium initiators. Specific examples of these polar compounds include aromatic ethers such as diphenyl ether and anisole, and tertiary monoamines such as trimethylamine, triethylamine and tripropylamines. They may be used singly or as a mixture of two or more. To prepare a tackifier composition containing a block copolymer having excellent properties while the molecular weight distribution of the polymer block of an aromatic vinyl monomers is as specified, the preferred amount of the polar compound may be 0.1 to 100 moles, more preferably 0.5 to 20 moles, per mole of the monolithium initiator.

In the present invention, the polymerization method of the aromatic vinyl monomer is not particularly limited, and may be anyone of the usually employed methods, for example, a batchwise polymerization in which all amount of the aromatic vinyl monomer and all amount of the initiator are charged into the polymerization system all at once, and reacted, the continuous polymerization by which they are continuously fed into the polymerization system, and reacted continuously, or a method in which a part of the monomer and a part of the initiator are used and polymerization is performed until a specific conversion is attained, and the remainder of the monomer and the remainder of the initator are added, and the polymerization is continued. The polymerization is carried out usually at 0° to 90° C., preferably 20° to 70° C. Where the reaction temperature is difficult to control, it is preferred to control the reaction temperature by refluxing cooling by using a reactor in which a refluxing-type condenser is provided.

[b] Then, a conjugated diene monomer is added to a polymerization system in which a polymer block A of an aromatic vinyl monomer having polymerization activity end is present. Preferably, the conjugated diene-type monomer is added continuously to control the heat of reaction. Other methods of addition may be employed. Thus, an (A—B) block copolymer in which the polymer block B of the conjugated diene monomer is directly bonded to the polymer block A of the aromatic vinyl monomer forms.

[c] After the end of the polymerization reaction of the conjugated diene monomer, a coupling agent is added to the reaction system to bond the (A—B) block copolymer having the active end to obtain a tri-branched block copolymer represented by the general formula $(A-B)_3X$ wherein A represents a polymer block of an aromatic vinyl monomer, B represents a polymer block of a conjugated diene-type monomer, and X represents a residue of a tri-functional or tetra-functional coupling agent of the alkoxysilane type. At this time, a known coupling promoter may be added.

[d] After tne end of the coupling reaction, water, an alcohol, and an acid, etc. may be added to deactivate the polymerization active seed. If required, an antioxidant is added, and then, the polymer is separated by a known polymer separating method (for example, steam stripping). In the drying step, the desired tri-branched block copolymer or a mixture of it with a linear diblock copolymer is obtained.

The second component in the present invention may be synthesized in the same way as in the first component except that the coupling agent used in [c].

The third component used in this invention (linear diblock copolymer) may be obtained by preparing a linear E-I block copolymer in which polymer block of the isoprene having polymerization active end is bonded directly to the polymer block E of the aromatic vinyl monomers in the same way as in the synthesizing process [a]-[b] of the tri-branched block copolymer, then deactivating the polymerization active seed, if required adding an antioxidant, and then subjecting the resulting polymer to separation and drying steps without performing a coupling reaction.

To obtain only the tri-branched block copolymer alone in a high yield, the optimum amount of the tri-functional or tetra-functional alkoxysilane-type coupling agent used is ⅓ mole per mole of the monolithium initiator used in the polymerization. If this amount is more than ⅓ mole, the second component is formed at the same time. If its amount is further increased, a linear block copolymer having an (A—B—X) structure with the residue of the coupling agent at the end which are as indicated above is formed in a large amount as a by-product. This linear block copolymer having the structure (A—B—X) bearing a residue of the coupling agent at the terminal tends to undergo hydrolysis in the step of forming the block copolymer, and is difficult to subject to steam coagulation. It is susceptible to gellation. Since this polymer tends to give rise to some problems, the amount of the trifunctional or tetrafunctional coupling agent used in this invention is preferably not more than 0.375 mole per mole of the monolithium initiator.

To employ a method in which the block copolymer composition of this invention is obtained simultaneously, the composition of the block copolymer mixture differs depending upon the types and amounts of the coupling agent and the coupling promoter. Accordingly, it is desirable to determine the type and the optimum amount of these agents by performing a preliminary experiment. Usually, it is preferred to select the amount of the coupling agent from the range of 0.15 to 0.375 mole per mole of the monolithium initiator, and the amount of the coupling agent from 2 to 12 moles per mole of the coupling agent.

The tackifier composition comprises mainly the block copolymer composition and a tackifier resin.

Conventional known tackifier resins may be used. They are specifically rosin; modified rosins such as disproportionated rosin and dimerized rosin; esters of polyhydric alcohols such as glycol, glycerin and pentaerythritol with rosins or modified rosins; terpene-type resins; aliphatic, aromatic, alicyclic or aliphatic-aromatic copolymer type hydrocarbon resins or hydrogenated products thereof; phenolic resins; and coumarone-indene resins. Especially preferred tackifier resins are aliphatic or aliphatic-aromatic copolymerized hydrocarbon resins which have good compatibility with the block copolymer composition of this invention. The amount of the tackifier resin is 10 to 150 parts by weight per 100 parts by weight of the block copolymer composition.

As required, softeners (plasticizers), anti-oxidants, heat stabilizers, ultraviolet absorbers, fillers or other compounding agents may be added to the tackifier compositions of this invention.

As the softeners, those which are customarily used in conventional tackifiers, for example, aromatic, paraffinic or naphthenic extender oils; and liquid polymers such as liquid polybutene and liquid polyisobutylene may be used. The amount of the softener is not more than 100 parts by weight per 100 parts by weight of the block copolymer composition. As the anti-oxidants, hindered phenolic compounds such as 2,6-di-tert-butyl-p-cresol, di-tert-butyl-4-methylphenol; thiodicarboxylate esters such as dilaurylthiopropionate; phosphites such as tris(nonylphenyl)phosphite may be used either singly or as a mixture.

There is no particular restriction on the method of mixing the block copolymer composition or the tackifier resin with the above additives. Examples include a method which comprises dissolving the components uniformly in the solvent, and removing the solvent by heating or the like, and a method by which the components are heat melted and mixed by a kneader, etc.

The tackifier composition of this invention may be used as a solvent-type tackifier dissolved in a solvent such as n-hexane, cyclohexane, benzene or toluene, an emulsion-type tackifier dispersed in water using an emulsifier, or a solventless hot-melt type tackifier. The hot-melt type tackifier is especially suitable.

According to this invention, a block copolymer composition for a tackifier having an excellent balance among initial adhesion strength, holding power, corrugated board sealability and processability and further excellent coloration stability with time as compared with the prior art may be obtained. By combining this composition with a tackifier resin, an excellent tackifier composition can be obtained.

The following Examples will illustrate the present invention specifically. All parts and percentages in these examples are by weight unless otherwise specified.

In the present Examples, the molecular weight of a polymer is the weight average molecular weight calculated for standard polystyrene which was determined by high-speed liquid chromatography using tetrahydrofuran as a carrier. The composition of the copolymer is determined from peak areas of the copolymer obtained by high performance liquid chromatography.

REFERENTIAL EXAMPLE 1

By using a 50-liter pressure-resistant reactor, in the presence of 18.75 kg of a mixed solvent composed of 30:70 of n-butane/cyclohexane mixed solvent, 240 millimoles of dibutyl ether and 120 millimoles of n-butyllilthim as an initiator, 1.52 kg of styrene was first polymerized at 30° C. for 1 hour. Then, 6.48 kg of isoprene was added, and was half-polymerized for 1 hour while the temperature was controlled by refluxing cooling so that the reaction temperature reached a value between 50° C. and 60° C. Then, 18 millimoles of tetrachlorosilane and 30 millimoles of diphenyldichlorosilane as a coupling agent were added, and a coupling reaction was carried out for 5 hours. Thereafter, 50 ml of methanol as a polymerization stopper, 40 g of tert-butyl phenol as an antioxidant were added to the reaction mixture. The resulting mixed solution was dropped onto hot water heated to 85° to 95° C. to volatilize the solvent. The resulting polymer was pulverized and dried with hot air to obtain a block copolymer composition (1). The molecular weight of the block polymer composition (1) was 240,000. The composition (1) contained 45% of a tri-branched block copolymer having a molecular weight of 300,000, 50% of a di-branched block copolymer having a molecular weight of a di-branched block copolymer, and 5% of a linear diblock copolymer having a molecular weight of 100,000.

REFERENTIAL EXAMPLES 2 to 19

Except that the monomer, the initiator, the coupling agent and the coupling promoter shown in Table 1, block copolymer compositions (2) to (19) having the molecular weights and compositions shown in Table 1 were obtained in the same way as in Referential Example 1. Incidentally, the coupling promoter was added together with the coupling agent at the time of the coupling reaction.

TABLE 1

| Block copolymer composition | ① | ② | ③ | ④ | ⑤ | ⑥ | ⑦ | ⑧ | ⑨ | ⑩ |
|---|---|---|---|---|---|---|---|---|---|---|
| Monomer (kg) | | | | | | | | | | |
| Styrene | 1.52 | 1.52 | 1.52 | 1.52 | 1.52 | 1.52 | 1.52 | 1.52 | 1.52 | 1.52 |
| Isoprene | 6.48 | 6.48 | 6.48 | 6.48 | 6.48 | 6.48 | 6.48 | 6.48 | 6.48 | 6.48 |
| Initiator (millimoles) | | | | | | | | | | |
| n-Butyllithium | 120 | 120 | 120 | 120 | 120 | 120 | 120 | 120 | 120 | 120 |
| Dibutyl ether | 240 | 240 | 240 | 240 | 240 | 240 | 240 | 240 | 240 | 240 |
| Amount of coupling agent (millimoles) | | | | | | | | | | |
| Tetrachlorosilane | 18 | 14 | | | | | | | | |
| Diphenyldichlorosilane | 30 | 21 | | | | | | | | |
| Tetramethoxysilane | | | 14 | 35 | 28 | | | 41 | 45 | 35 |
| Phenyltrimethoxysilane | | | | | | 22.5 | 8.5 | | | |
| Diphenyldimethoxysilane | | | 21 | | | 8.5 | 29.5 | | | |
| Coupling promoter (millimoles) | | | | | | | | | | |
| Dibutyl ether | | | 840 | | | | | 1440 | 840 | 840 |

TABLE 1-continued

| Block copolymer composition | | | | | | | | | | |
|---|---|---|---|---|---|---|---|---|---|---|
| Molecular weight | 24.0 | 20.5 | 20.5 | 20.5 | 24.0 | 22.5 | 19.0 | 16.0 | 24.0 | 20.5 |
| Composition (%) | | | | | | | | | | |
| Tri-branched block*1 copolymer | 45 | 35 | 35 | 35 | 70 | 56 | 21 | 7 | 45 | 35 |
| Di-branched block*2 copolymer | 50 | 35 | 35 | 35 | | 14 | 49 | 63 | 45 | 35 |
| Linear diblock*3 copolymer | 5 | 30 | 30 | 30 | 30 | 30 | 30 | 30 | 10 | 30 |

| Block copolymer composition | ⑪ | ⑫ | ⑬ | ⑭ | ⑮ | ⑯ | ⑰ | ⑱ | ⑲ |
|---|---|---|---|---|---|---|---|---|---|
| Monomer (kg) | | | | | | | | | |
| Styrene | 1.52 | 1.52 | 1.52 | 1.52 | 0.49 | 2.31 | 1.52 | 1.52 | 1.52 |
| Isoprene | 6.48 | 6.48 | 6.48 | 6.48 | 6.51 | 4.69 | 6.48 | 6.48 | 6.48 |
| Initiator (millimoles) | | | | | | | | | |
| n-Butyllithium | 120 | 120 | 300 | 60 | 120 | 120 | 120 | 120 | 120 |
| Dibutyl ether | 240 | 240 | 600 | 120 | 240 | 240 | 240 | 240 | 240 |
| Amount of coupling agent (millimoles) | | | | | | | | | |
| Tetrachlorosilane | | | | | | | | | |
| Diphenyldichlorosilane | | | | | | | | | |
| Tetramethoxysilane | 25 | 20 | 70 | 17.5 | 35 | 35 | | | |
| Phenyltrimethoxysilane | | | | | | | 35 | 28 | |
| Diphenyldimethoxysilane | | | | | | | | | 42 |
| Coupling promoter (millimoles) | | | | | | | | | |
| Dibutyl ether | 840 | 840 | 1680 | 420 | 840 | 840 | 840 | | |
| Block copolymer composition | | | | | | | | | |
| Molecular weight | 17.5 | 16.0 | 10.0 | 41.0 | 20.5 | 20.5 | 20.5 | 24.0 | 17.0 |
| Composition (%) | | | | | | | | | |
| Tri-branched block*1 copolymer | 25 | 20 | 35*4 | 35*7 | 35 | 35 | 35 | 70 | |
| Di-branched block*2 copolymer | 25 | 20 | 35*5 | 35*8 | 35 | 35 | 35 | | 70 |
| Linear diblock*3 copolymer | 50 | 60 | 30*6 | 30*9 | 30 | 30 | 30 | 30 | 30 |

*1 Molecular weight (unless specifically indicated) 300,000
*2 Molecular weight (unless specifically indicated) 200,000
*3 Molecular weight (unless specifically indicated) 100,000
*4 Molecular weight 120,000
*5 Molecular weight 80,000
*6 Molecular weight 40,000
*7 Molecular weight 600,000
*8 Molecular weight 400,000
*9 Molecular weight 200,000

EXAMPLES 1-1 to 1-5

The block copolymer composition shown in Table 2 was added to a stirring vane-type kneader in an amount of 125 parts, and 100 parts of a tackifier resin (Quintone M-100, a product of Nippon Zeon Co., Ltd.), 30 parts of a naphthenic process oil (Shellflex 371, a product of Shell Chemical Co.), and 1 part of an antioxidant (Antage W400, a product of Kawaguchi Chemical Industry Co., Ltd.) were added. After the inside of the reaction system was purged with nitrogen gas, they are kneaded at 160° to 180° C., a tackifier composition was prepared. The resulting tackifier composition was coated on kraft paper to a coated thickness of 25 micrometers with a hot melt coater to prepare an adhesive tape. The initial adhesion strength of this tackifying tape, and the intial adhesion strength, holding power and corrugated board sealability of other adhesive tapes were measured. The coloration stabilty with time of the the above tackifying composition was measured. The results are shown in Table 2.

The initial adhesion strength was measured in accordance with JIS-Z0237. Specifically, an adhesive tape having a length of 10 cm was applied with the adhesive surface directed upwardly on an inclined surface on stainless steel plate at an inclination angle of 30 degrees at 23° C. Steel balls having thirty types of size from a diameter of 3/32 inch to 1 inch were each rolled from a position 10 cm above the oblique surface at an initial speed of 0. The largest diameter (No.) of the steel ball which stopped on the adhesive tape was recorded.

The holding power was measured in accordance with JIS-Z0237. Specifically, to stainless steel treated as above, an adhesive tape was applied so that its area of 25 mm × 10 mm are contacted. At 50° C., a load of 1 kg was applied, and the time(minutes) which was required for the adhesive tape to drop from the stainless steel plate was recorded.

In measuring the corrugated board sealability, two corrugated boards were aligned parallel to each other with a slight gap therebetween, and adhesive tapes were applied to the corrugated boards so that the center lines of the adhesive tapes were positioned in the gap portion. By any desired means, the distance between the two corrugated boards was widened, and the time which elapsed until interface desruction occurred was measured. MTTF (mean time to failure) obtained from the measured value was indicated as a measure of corrugated board sealability. In the above three property values, the larger values means better values.

The coloration stability with time was measured by the following method. As a measure of this stability, a small amount of a melt-kneaded adhesive composition was taken into an aluminum dish and left to stand for 10 hours in an oven maintained at 120° C., and the color of the surface was indicated by the Gardner No. The smaller this number, the better the coloration stability with time.

TABLE 2

|  | Example | Control 1-1 | Control 1-2 | Invention 1-3 | Invention 1-4 | Invention 1-5 |
|---|---|---|---|---|---|---|
| Block copolymer composition | No. | ① | ② | ③ | ④ | ⑱ / ⑲ |
|  | Mixing proportion | — | — | — | — | 50/50 |
|  | Composition |  |  |  |  |  |
|  | Ti-branched block copolymer | 45 | 35 | 35 | 35 | 35 |
|  | Di-branched block copolymer | 50 | 35 | 35 | 35 | 35 |
|  | Linear diblock copolymer | 5 | 30 | 30 | 30 | 30 |
| Properties | Initial adhesion strength (ball No.) | 11 | 14 | 14 | 14 | 14 |
|  | Holding power (min.) | 800 | ≧1000 | ≧1000 | ≧1000 | ≧1000 |
|  | Corrugated board sealability (min.) | 300 | ≧500 | ≧500 | ≧500 | ≧500 |
|  | Coloration stability with time | ≧10 | ≧10 | ≦4 | ≦4 | ≦4 |

From the the results of Table 2, when coupling agents other than the alkoxysilane type were used, the holding power and the coloration stability with time of the tackifying compositions were inferior and the initial adhesion strength or corrugated board sealability of the composition were not sufficient.

EXAMPLES 2-1 to 2-4

Tackifier compositions were prepared as in Example 1 from the block copolymer compositions shown in Table 3, and tested in the same way as in Example 1.

The results are shown in Table 3. It is seen from the results given in Table 3 that the ratio of (I) to (II) in the block copolymer composition was outside the range specified by the invention, the resulting block copolymer composition had inferior corrugated boards sealability.

TABLE 3

|  | Example | Control 2-1 | Invention 2-2 | Invention 2-3 | Control 2-4 |
|---|---|---|---|---|---|
| Block copolymer composition | Number | ⑤ | ⑥ | ⑦ | ⑧ |
|  | (I)/(II) | 100/0 | 80/20 | 30/70 | 10/90 |
|  | [(I) + (II)]/(III) | 70/30 | 70/30 | 70/30 | 70/30 |
| Properties | Initial adhesion strength (ball No.) | 13 | 14 | 14 | 14 |
|  | Holding power (min.) | >1000 | ≧1000 | ≧1000 | ≧1000 |
|  | Corrugated board sealability (min.) | 400 | ≧500 | ≧500 | 350 |
|  | Coloration stability with time | ≦4 | ≦4 | ≦4 | ≦4 |

EXAMPLES 3-1 to 3-4

From the block copolymer compositions shown in Table 4, tackifier compositions were prepared in the same way as in Example 1, and tested as in Example 1. The results are shown in Table 4.

The results given in Table 4 show that if the ratio of [(I)+(II)] to (III) is outside the range specified in this invention, the holding power and corrugated board sealability of the tackifier composition are inferior.

TABLE 4

|  | Example | Control 3-1 | Invention 3-2 | Invention 3-3 | Control 3-4 |
|---|---|---|---|---|---|
| Block copolymer composition | Number | ⑨ | ⑩ | ⑪ | ⑫ |
|  | (I)/(II) | 50/50 | 50/50 | 50/50 | 50/50 |
|  | [(I) + (II)]/(III) | 90/10 | 70/30 | 50/50 | 40/60 |
| Properties | Initial adhesion strength (ball No.) | 11 | 14 | 14 | 14 |
|  | Holding power (min.) | 800 | ≧1000 | ≧1000 | ≧1000 |
|  | Corrugated board sealability (min.) | 300 | ≧500 | ≧500 | 400 |
|  | Coloration stability with time | ≦4 | ≦4 | ≦4 | ≦4 |

EXAMPLES 4-1 to 4-5

From the copolymer compositions shown in Table 5, tackifier compositions were prepared in the same way as in Example 1. The same properties as in Example 1 and melt viscosities of the tackifier compositions in accordance with JIS-K7210 as a measure of processability were measured.

The results are shown in Table 5.

From the results shown in Table 5, it was found than when the molecular weight of each of the block copolymers constituting the composition of this invention or the ratio of the polymer block of the aromatic vinyl monomer to the polymer block of the conjugated diene monomer are outside the ranges specified in this invention, the tackifier properties of the resulting tackifier composition greatly decreased.

block E to the polymer block I being from (10/90) to (30/70), the weight ratio of the copolymers (I), (II) and (III) satisfy the following relation $(I)/(II) = (20/80)$ to $(90/10)$ and $[(I)+(II)]/(III) = (45/55)$ to $(80/20)$.

TABLE 5

| | Example | Control 4-1 | 4-2 | Invention 4-3 | Control 4-4 | 4-5 |
|---|---|---|---|---|---|---|
| Block copolymer composition | Number | ⑬ | ⑭ | ⑰ | ⑮ | ⑯ |
| | Molecular weight of (I) | 120,000 | 600,000 | 300,000 | 300,000 | 300,000 |
| | Molecular weight of (II) | 80,000 | 400,000 | 200,000 | 200,000 | 200,000 |
| | Molecular weight of (III) | 40,000 | 200,000 | 100,000 | 100,000 | 100,000 |
| | Ratio of the constituent blocks (*1) | 19/81 | 19/81 | 19/81 | 7/93 | 33/69 |
| Properties | Initial adhesion strength (ball No.) | ≦3 | 14 | 14 | 7 | 5 |
| | Holding power (min.) | <50 | 500 | ≧1000 | <50 | 500 |
| | Corrugated board sealability (min.) | <50 | 350 | ≧500 | <50 | <50 |
| | Coloration stability with time | ≦4 | ≦4 | ≦4 | ≦4 | ≦4 |
| | Melt viscosity (× 1000 cp) | 30 | >1500 | 200 | 40 | >1500 |

(*1): Aromatic vinyl monomer block/conjugated diene-type monomer block

We claim:

1. A block copolymer composition comprising
(A) A tri-branched block copolymer (I) having a weight average molecular weight of 150,000 to 450,000 represented by the general formula $(A-B)_3X$ wherein A represents a polymer block of an aromatic vinyl monomer, B represents a polymer block of a conjugated diene monomer, and X represents a residue of a tri-functional or tetra-functional alkoxysilane coupling agent, and the weight ratio of the polymer block A to the polymer block B is from 10/90 to 30/70,
(B) a di-branched block copolymer (II) having a weight average molecular weight of 100,000 to 300,000 represented by the general formula $(C-D)_2Y$ wherein C represents a polymer block of an aromatic vinyl monomer, D represents a polymer block of a conjugated diene monomer, and Y represents a residue of a di-functional to tetra-functional coupling agent, and the weight ratio of the polymer block C to the polymer block D is from 10/90 to 30/70, and
(C) a linear diblock copolymer (III) having a weight average molecular weight of 50,000 to 150,000 represented by the general formula $E-I$ wherein E represents a polymer block of an aromatic vinyl monomer, and I represents an isoprene polymer block, and the weight ratio of the polymer 2. The block copolymer composition of claim 1 in which at least one of A, C and E is polystyrene.
3. The block copolymer composition of claim 1 in which A, C and E are all polystyrene.
4. The block copolymer composition of claim 1 in which at least one of B and D is polyisoprene.
5. The block copolymer composition of claim 1 in which B and D are both polyisoprene.
6. The block copolymer composition of claim 1 in which A, C and E are all polystyrene, and B and D are both polyisoprene.
7. The block copolymer composition of claim 1 in which the difunctional coupling agent is diphenyldimethoxysilane.
8. The block copolymer composition of claim 1 in which the trifunctional coupling agent is phenyltrimethoxysilane.
9. The block copolymer composition of claim 1 in which the tetrafunctional coupling agent is tetramethoxysilane.
10. The block copolymer composition of claim 1 in which the weight ratio of the polymer block A to the polymer block B is from 12/88 to 25/75, the weight ratio of the polymer block C to the polymer block D is from 12/88 to 25/75, and the weight ratio of the polymer block E to polymer block I is from 12/88 to 25/75, and the weight ratio of block copolymers (I), (II) and (III) is (I)/(II) equals (40/60) to (80/20), and [(I)+(II)]/(III) equals (50/50) to (75/25).
11. A tackifier composition comprising 100 parts by weight of a block copolymer composition for a tackifier of claim 1, and 10 to 150 parts of a tackifier resin.
12. The tackifier composition of claim 11 in which the tackifier resin is an aliphatic or aliphatic-aromatic copolymer-type hydrocarbon resin.

* * * * *